J. W. B. HARRY.
EVAPORATING PAN.
APPLICATION FILED MAR. 1, 1910.

989,354.

Patented Apr. 11, 1911.

2 SHEETS—SHEET 1.

Witnesses
J. T. L. Wright
C. C. Hines

Inventor
John W. B. Harry,
By Victor J. Evans,
Attorney

J. W. B. HARRY.
EVAPORATING PAN.
APPLICATION FILED MAR. 1, 1910.

989,354.

Patented Apr. 11, 1911.
2 SHEETS—SHEET 2.

Witnesses
J. T. L. Wright
C. C. Hines

Inventor
John W. B. Harry

By Victor J. Evans,
Attorney

UNITED STATES PATENT OFFICE.

JOHN W. B. HARRY, OF SVEA, FLORIDA.

EVAPORATING-PAN.

989,354.

Specification of Letters Patent. Patented Apr. 11, 1911.

Application filed March 1, 1910. Serial No. 546,722.

*To all whom it may concern:*

Be it known that I, JOHN W. B. HARRY, a citizen of the United States, residing at Svea, in the county of Walton and State of Florida, have invented new and useful Improvements in Evaporating-Pans, of which the following is a specification.

This invention relates to an evaporating pan for making syrups, jellies, preserves, etc., the object of the invention being to provide a simple, inexpensive and efficient construction of evaporating pan embodying means for heating the pan by the action of steam in such a manner as to facilitate the boiling of the juice and its separation from the impurities whereby the latter may be removed in an expeditious manner and with a minimum amount of trouble and labor.

The invention consists in the novel construction, combination and arrangement of devices, hereinafter fully described, illustrated and claimed.

Figure 1:
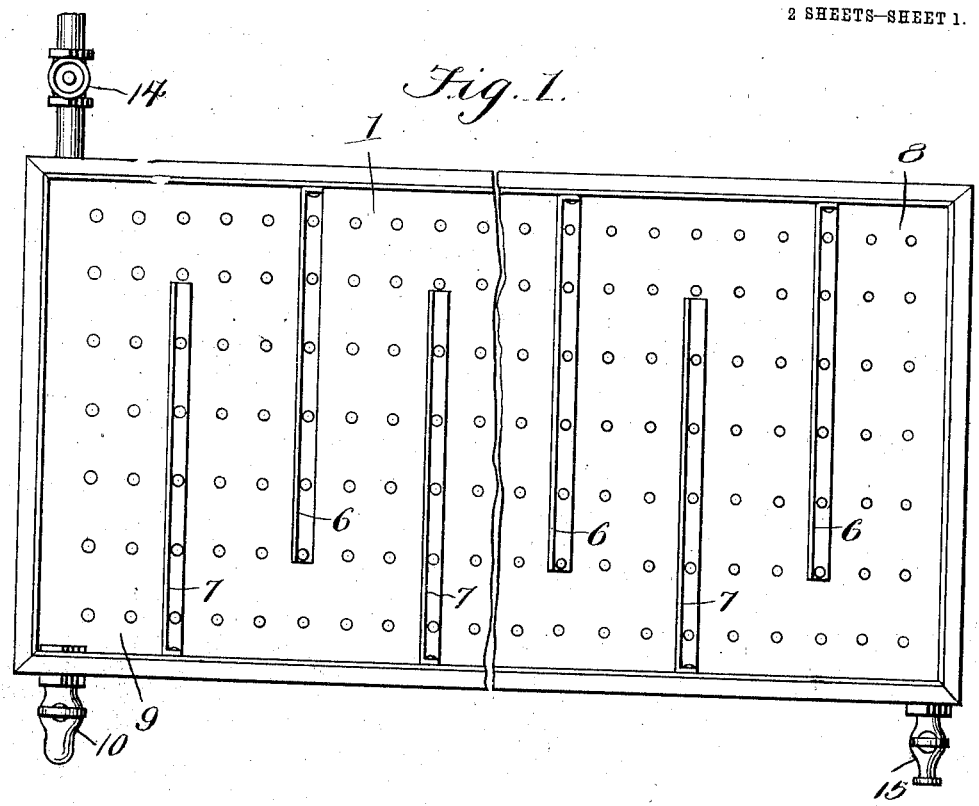
Figure 3:
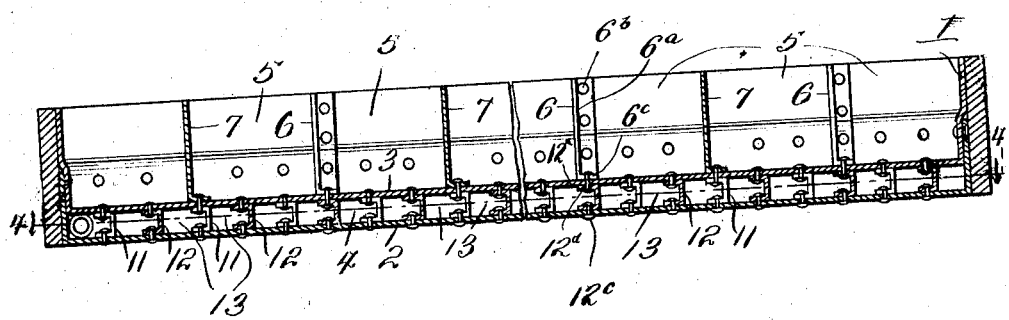
Figure 2:
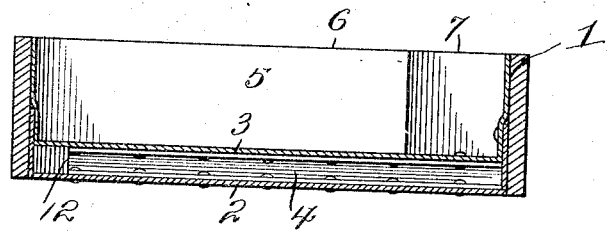
Figure 4:
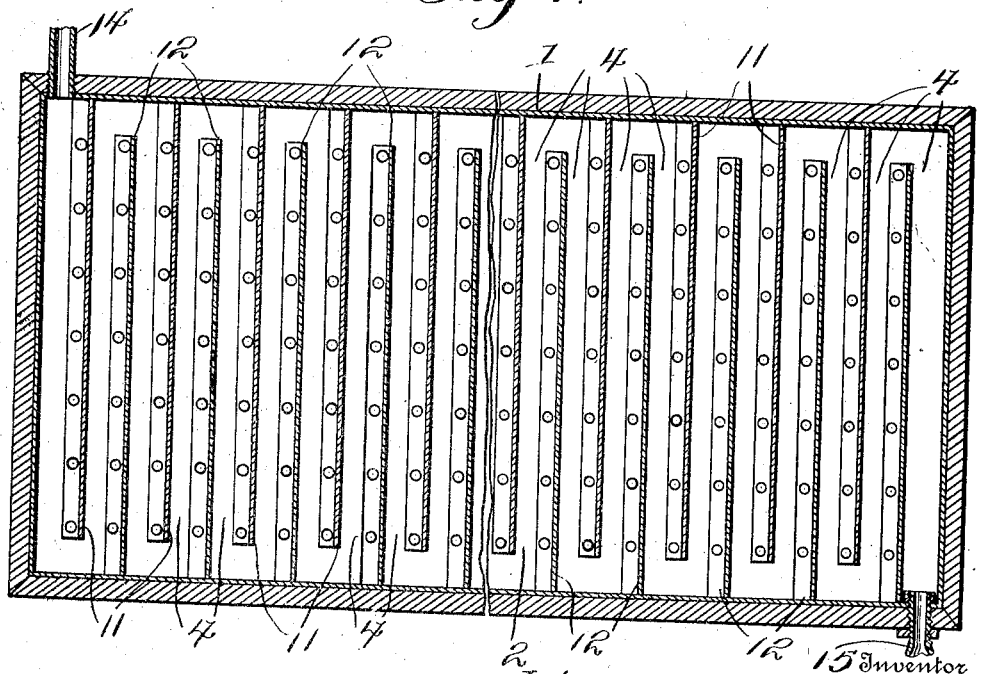

In the accompanying drawing:—Figure 1 is a top plan view of an evaporating pan embodying my invention. Fig. 2 is a vertical, transverse section of the same. Fig. 3 is a vertical, longitudinal section on the pan. Fig. 4 is a horizontal section taken on the plane indicated by the line 4—4 of Fig. 3.

Referring to the drawings, 1 designates the body of the pan, which is of oblong form and may be of any suitable length and width, and is supported in practice in an inclined position for the flow of the juice by gravity from the inlet to the discharge end.

The pan is made in practice of sheet metal and provided with a bottom 2, above which is arranged a false bottom or horizontal partition 3, extending the full length and width of the pan. This false bottom or partition 3 separates the body of the pan to form a lower heating chamber or compartment 4 and an upper boiling or evaporating compartment 5, which latter may be of a desired depth to hold a considerable quantity of juice.

The compartment 3 is provided with transversely extending vertical partitions 6 and 7, projecting alternately in opposite directions from the side walls of the pan and terminating short of the opposite side wall thereof, thus forming a zigzag or circuitous passage for the flow of the juice from the upper transverse portion 8 of the passage, forming the inlet end thereof, to a lower transverse branch 9 of the passage, forming the discharge end thereof, at which point the pan is provided at one side with a valved outlet 10 for the passage of the syrup. The raw juice may be fed into the branch 8 in any preferred manner, and flows by gravity therefrom back and forth through the compartment 5 in which it is heated and clarified until it reaches the branch 9 in the form of pure syrup, and then passes through the outlet 10 into any suitable receptacle. The heating compartment 4 is also provided with vertical transverse partitions 11 and 12, extending alternately from opposite sides thereof and also the full distance between the bottom wall 2 and superposed false bottom 3, to which they are riveted or otherwise suitably fastened. The free end of each partition 11 and 12 terminates short of the side wall opposite that from which it extends to provide a zigzag or circuitous steam channel or passage 13 leading from one side of the lower end of the pan to the opposite side of the upper end of the pan. As shown, the lower end of the pan is provided at one side with a valved steam inlet 14, while the upper end of the pan is provided at its opposite side with a valved steam exhaust connection or outlet 15, whereby the steam on its passage through the zigzag channel will heat the false bottom 3 and the contents of the chamber 5 and finally exhaust through the outlet 15. By the provision of a channel of the form described, all of the available heat units of the flowing steam are utilized, and the construction of the pan, as a whole, is also of such a simple character as to enable it to be conveniently manufactured at a low cost.

It will be observed that the partitions 6 and 7 consist of angle metal plates, each having an end flange 6ª secured to the side wall of the evaporating compartment from which it extends by rivets 6ᵇ and a base flange 6ᶜ which bears against the partition 3. Also that the partitions 11 and 12 within the heating compartments are of channeled shape, each having upper and lower horizontal flanges or webs 12ª and 12ᵇ, said webs 12ᵇ being secured to the bottom wall 2 by rivets 12ᶜ, while the webs 12ª bear against the under side of the partition 12 and are united thereto by rivets 12ᶜ. Certain of the partitions 11 and 12 are arranged in vertical alinement with the partitions 6 and 7 and are united therewith to the partition 3 by the rivets 12ᶜ, which pass through the base flanges of the transverse partitions in the evaporating compartment and through the upper flanges of the underlying partitions in the heating compartment. By this construction an exceedingly strong and durable evaporator is provided and the partitions secured firmly against possible loosening or displacement.

In the operation of the pan, the valves in the connections 14 and 15 are opened allowing steam to pass into and flow through the channel 13, until the wall 3 is heated to the desired degree, when the raw syrup to be treated is allowed to flow into the inlet end 8 of the zigzag syrup channel in the compartment 5. This syrup on its flow through the channel will be heated to the boiling point, whereby the scum and other impurities will be caused to rise therefrom, thus clarifying and otherwise purifying the juice, which, when it reaches the lower end or branch of the channel, is ready for discharge through the outlet 10 and storage into receptacles for commercial use.

It will be understood that by causing the steam to flow in an upward direction through the heating chamber, or in a direction reverse to the flow of the juice through the channel in the evaporating chamber, the juice in the lower branches of the channel 13 will be heated progressively to a much higher degree than the juice in the upper branches of the channel, in which latter, the juice will be comparatively cool. By this method of treatment, the juice will be boiled and clarified to a high degree before it reaches the lower branches of the channel while at the same time the scum and other impurities rising from the lower portion of the body of the juice will be caused to flow back on the comparatively still or calm cooler portion of the body of the juice, from which it may be easily and conveniently skimmed or otherwise removed. As a result, the hot juice at the lower end of the passage will be clear and free from scum and will discharge through the outlet 10 without drawing any of the scum or other impurities with it, whereby an absolutely pure and clear syrup will be obtained in a simple and convenient manner and with a minimum amount of trouble and labor.

Having thus described the invention, what is claimed, is:—

An evaporating pan comprising an oblong rectangular body having a bottom, a horizontal partition above the bottom and dividing the pan to provide an upper evaporating compartment and a lower heating compartment, transverse partitions extending alternately from opposite sides of the evaporating compartment and forming a zigzag syrup channel, each of said partitions having an end flange to bear against and riveted to the side wall from which it extends and a base flange resting on the horizontal partition, channeled transverse partitions extending alternately from opposite sides of the heating compartment and each having a base flange riveted to the bottom of the evaporator body and a top flange riveted to the horizontal partition, certain of said transverse partitions in the heating compartment being arranged in alinement with the transverse partitions in the evaporating compartment, rivets passing through the horizontal partition and the upper heating and evaporating compartments, valved inlet and outlet passages communicating with the ends of the syrup channel, and valved inlets and outlets connected with the ends of the heating channel.

In testimony whereof I affix my signature in presence of two witnesses.

JOHN W. B. HARRY.

Witnesses:
R. A. FRENCH,
F. A. WILBUR.